Feb. 6, 1968  J. K. LEASURE  3,367,577
METHOD FOR LOGARITHMIC STEP SPRAYING
Filed June 6, 1966
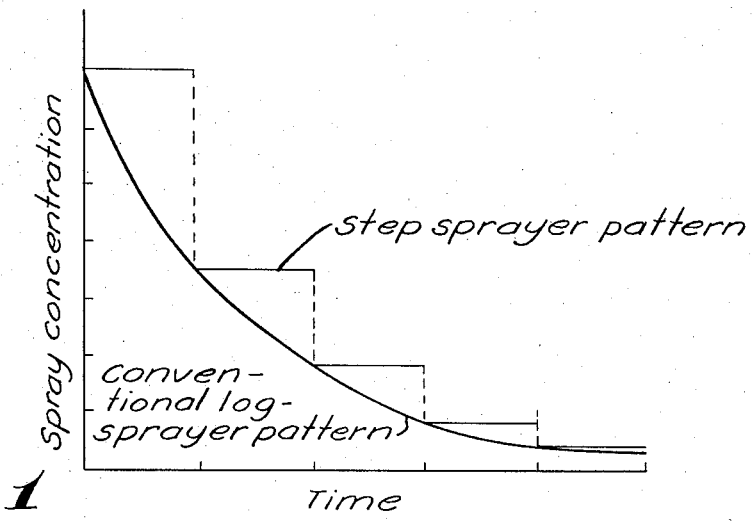
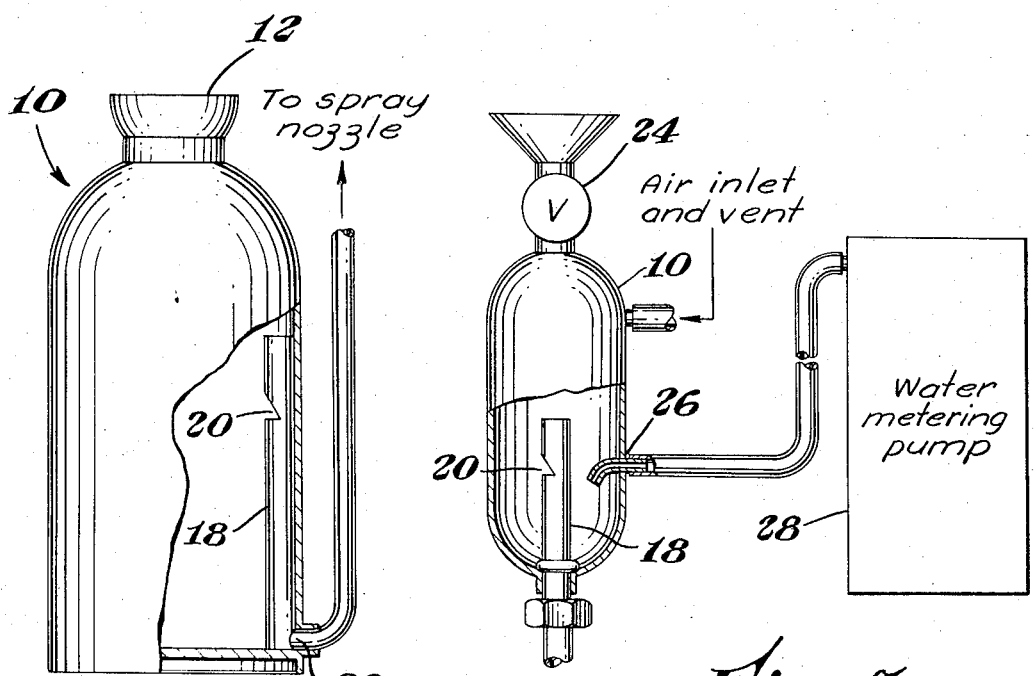
INVENTOR.
John K. Leasure
BY
AGENT United States Patent Office 3,367,577
Patented Feb. 6, 1968

3,367,577
METHOD FOR LOGARITHMIC STEP SPRAYING
John K. Leasure, Carbondale, Ill., assignor to The Dow Chemical Company, Midland, Mich., a corporation of Delaware
Filed June 6, 1966, Ser. No. 555,592
2 Claims. (Cl. 239—11)

ABSTRACT OF THE DISCLOSURE

A method of applying fluids in a logarithmic or other exponential series of discrete steps by applying for a predetermined time at a starting concentration and automatically stopping, whereupon the concentration is adjusted to the next desired level and application is again continued for a predetermined time.

---

This invention relates to a variable dosage sprayer, and is more particularly concerned with a sprayer adapted to apply chemicals or other fluids in a logarithmic or other exponential series of discrete steps.

In 1955, Pfeifer, Brunskill and Hartley described a variable dosage sprayer for agricultural experiments (Nature 176:472, 1955). The concept received attention in many areas of agricultural research and a large number of logarithmic concentration sprayers have been built. One such sprayer is described in Down to Earth, vol. 14, No. 3, 1958. These sprayers, although extremely versatile and widely used, have some rather serious drawbacks. Dedolph, American Soc. Hort. Sci. Proc., 75, 789–798, June 1960, suggested some procedures to overcome some of the problems of handling data obtained from log-sprayer treatments.

Among the disadvantages of the conventional log-sprayers are that any one concentration occurs only instantaneously and that the concentration changes very rapidly during the first portion of an application. These disadvantages have been overcome with the novel sprayer of this invention. This sprayer, called a step-sprayer, applies a spray in a logarithmic or other predetermined exponential series, but it does so in discrete steps. It will spray for a pretermined time at the starting concentration, then stop spraying, the concentration is adjusted to the next desired level, then spray at that rate for the same predetermined time. This cycle is repeated as often as desired. The steps can be adjusted to any desired ratio, to any fraction or multiple, such as, for example, by adding a diluent such as water, or to twice or three times or more, of the previous level by adding a concentrate of the material to be sprayed and the process simply results in changing the smooth curve of an exponential sprayer into a series of discrete steps which follow a predetermined curve.

The invention will be further illustrated by the following description and attached drawings wherein:

FIGURE 1 is an illustration of spray patterns obtained with the conventional logarithmic sprayers and with the step-sprayer of this invention when both are operated in a diluting mode.

FIGURE 2 is a schematic diagram of one embodiment of a step sprayer in accordance with this invention, and FIGURE 3 is a schematic diagram of another embodiment of the step-sprayer of this invention.

Referring to FIGURE 2, it is seen that the sprayer of this invention comprises a container 10, having a cover 12 fitted with a pressurizing means (not shown) and an outlet 22 which is in communication with a spray nozzle (not shown). Positioned within the container 10, is a step-control tube or conduit 18 having a vent or inlet 20 therein. The step-control tube 18 leads to outlet 22 and controls the amount of material in the tank which may be discharged through outlet 22.

In FIGURE 3 an arrangement is illustrated wherein the operation of the sprayer may be automatically controlled. In this arrangement, tank 10 is initially filled through valve 24 and pressure is applied though inlet 26.

When the level of the spray solution reaches the vent 20 in the step-control tube 18, the sprayer discharges air. The pressure is then removed, the tank vented and a measured amount of water is added, advantageously by means of a water metering pump 28, refilling the tank to its original level. Pressure is then applied and spraying resumed. These operations can all be controlled automatically or by individual switches as desired. The sprayer illustrated in FIG. 3 may be controlled by three electrical switches for pressure, vent, refill, and spray.

The refilling operation in this sprayer may be controlled by a pre-set automatic pipetting machine which simply injects the desired amount of water. No valves or checks are required in this system. The injected water is advantageously directed into the cylindrical tank at a slight downward angle, the resulting swirl providing adequate mixing. The water inlet fitting and the spray nozzle may be set in epoxy cement, or may be soldered or otherwise fitted as the materials of construction dictate.

The step-control tube extends well above the water inlet 26, and the upper end is advantageously closed to avoid a vortex developing some time before the liquid reaches the desired cut-off level thereby distorting the spray pattern by entraining air.

The step characteristics are controlled by the ratio of spray volume retained in the sprayer to total volume. This is, of course, controlled by the original fill (and refill) level and by the height of the inlet port in the step-control tube. The length of time that each step (concentration) is sprayed is controlled by the volume above the port in the step-control tube and by the discharge rate. For the small lab sprayer described herein, the step-control tube is made of polyethylene tubing, heat formed with a flange to seal flush in the bottom of the sprayer. The tube is quickly and easily replaced to change the step interval, either by removal through the filling valve, or by removal through the exit port of the tank or container, it being understood that in this latter case the flange is exterior to the container. If desired, the sprayer may be constructed with a telescoping step control tube which may be elevated or lowered to any desired position by external means which are now shown. Alternatively, the inlet into the step-control tube might be by means of a ball valve, or other type of check valve, whereby the tube is closed unless the vessel is in a spraying position.

For illustration it is assumed that spraying 50 ml. gives a satisfactory step length. The automatic pipetting machine is set for 50 ml. delivery. The only sprayer adjustment required to change the spacing is the height of the inlet ports in the step-control tube. If the height of the inlet ports is such that 50 ml. will be retained, the sprayer will apply successive concentrations at one-half the previous rate; at 20 (starting rate), 10 and 5 lbs./acre, for example. If the inlet ports are at the 100 ml. level and the pipetting machine is set for 50 ml. delivery then the sprayer will apply successive concentrations of two-thirds the previous rate, e.g., 30; 20 and 13.3 lbs./acre. The sprayer will continue for as many steps as are desired.

If it is desired to apply wettable powders, means for agitating the suspension to be sprayed are advantageously included in the apparatus of this invention.

The step sprayer has all of the advantages of the conventional log-sprayer and, in addition, each dosage is applied for a definite interval which permits treating enough plants at that dosage to provide a reliable reading. This is a considerable advantage over the point-dosage reading obtained from a standard continuous-curve log-sprayer.

While the description has been presented in connection with applying earth or plant treating agents it is obvious that the sprayer of this invention can be employed in any operations wherein variable spray treatments are desired such as, for example, in the treatment of fabrics, dyeing operations, painting operations and the like.

What is claimed is:

1. The method of varying the concentration of a liquid to be sprayed from a pressurized container such that the resultant spray concentration vs. time curve will resemble a logarithmic curve with a series of discrete steps; which comprises utilizing a step-control outlet conduit extending to a predetermined height within the container, the height position of the conduit determining the amount of liquid retained in the container and the rate of proportional dilution of the same, spraying that portion of the contents of the container above the conduit inlet for a predetermined time, which is determined by the height of the outlet conduit and the discharge rate, and at a uniform concentration, and thereafter refilling the container with water so as to proportionally dilute the concentration of the remaining liquid or to add concentrate to proportionally increase the concentration of the remaining liquid and repeating the cycle.

2. Method of claim 1 which comprises utilizing a step-control outlet conduit which is placed at various levels relative to the level of liquid in the container, thereby further altering the dilutions between spray cycles.

References Cited

UNITED STATES PATENTS

| | | | |
|---|---|---|---|
| 1,225,416 | 5/1917 | De Khotinsky | 137—577 |
| 1,949,364 | 2/1934 | Ball | 137—577 X |
| 2,331,117 | 10/1943 | Goodhue et al. | 239—342 X |

M. HENSON WOOD, JR., *Primary Examiner.*

H. NATTER, *Assistant Examiner.*